United States Patent
Becker et al.

(10) Patent No.: US 7,657,233 B2
(45) Date of Patent: Feb. 2, 2010

(54) DEVICE FOR CALCULATING FSM BITS IN THE UMTS STANDARD

(75) Inventors: Burkhard Becker, Ismaning (DE);
Christian Drewes, Germering (DE);
Jürgen Niederholz, Kerken (DE);
Manfred Zimmermann, München (DE)

(73) Assignee: Infineon Technologies AG, Munich (DE)

( * ) Notice: Subject to any disclaimer, the term of this patent is extended or adjusted under 35 U.S.C. 154(b) by 834 days.

(21) Appl. No.: 10/511,528

(22) PCT Filed: Mar. 28, 2003

(86) PCT No.: PCT/DE03/01036

§ 371 (c)(1),
(2), (4) Date: Dec. 12, 2005

(87) PCT Pub. No.: WO03/090377

PCT Pub. Date: Oct. 30, 2003

(65) Prior Publication Data

US 2006/0154614 A1    Jul. 13, 2006

(30) Foreign Application Priority Data

Apr. 22, 2002    (DE) ................. 102 17 853

(51) Int. Cl.
*H04B 17/00*    (2006.01)
(52) U.S. Cl. ................. 455/69; 375/299; 375/347
(58) Field of Classification Search ............... 375/267, 375/299, 347; 455/69, 522
See application file for complete search history.

(56) References Cited

U.S. PATENT DOCUMENTS

| 6,611,675 | B1 * | 8/2003 | Salonen et al. ............. 455/69 |
| 6,766,144 | B2 * | 7/2004 | Kim et al. ............. 455/67.11 |
| 6,892,059 | B1 * | 5/2005 | Kim et al. ............. 455/272 |
| 7,099,634 | B2 * | 8/2006 | Tanaka ............. 455/101 |
| 7,116,723 | B2 * | 10/2006 | Kim et al. ............. 375/267 |
| 7,277,407 | B2 * | 10/2007 | Kim et al. ............. 370/328 |
| 2002/0006168 | A1 * | 1/2002 | Lee et al. ............. 375/267 |
| 2002/0009156 | A1 | 1/2002 | Hottinen et al. |
| 2002/0018530 | A1 | 2/2002 | Kim et al. |
| 2002/0186785 | A1 * | 12/2002 | Hoshino et al. ............. 375/299 |
| 2003/0073410 | A1 * | 4/2003 | Hottinen et al. ............. 455/69 |

FOREIGN PATENT DOCUMENTS

EP    1 143 636 A2    10/2001

(Continued)

OTHER PUBLICATIONS

3GPP TS 25.214 UMTS (Universal Mobile Telecommunications System), V 4.2.0 (Sep. 2001), pp. 33-41.

(Continued)

*Primary Examiner*—David C Payne
*Assistant Examiner*—Leon Flores
(74) *Attorney, Agent, or Firm*—Eschweiler & Associates, LLC

(57) ABSTRACT

The invention relates to a device for calculating FSM bits by means of which the signals sent from two antennas of a base station are influenced with reference to their phase difference and/or their amplitudes. The FSM bits are calculated with the aid of two estimated channel impulse responses. The device is present in hard-wired form.

18 Claims, 2 Drawing Sheets

FOREIGN PATENT DOCUMENTS

| | | |
|---|---|---|
| EP | 1 146 660 A2 | 10/2001 |
| EP | 1 175 022 A2 | 1/2002 |
| GB | 2 353 437 A | 2/2001 |
| WO | WO 01/69814 A1 | 9/2001 |
| WO | WO 02/32017 A1 | 4/2002 |

OTHER PUBLICATIONS

International Search Report, Int. Application No. PCT/DE03/01036, Int. Filing Date Mar. 28, 2003, 3 pages.

* cited by examiner

US 7,657,233 B2

DEVICE FOR CALCULATING FSM BITS IN THE UMTS STANDARD

RELATED APPLICATION

This application is a national stage application of International Application No. PCT/DE03/01036 filed Mar. 28, 2003, which is entitled "DEVICE FOR CALCULATING FSM BITS IN THE UMTS STANDARD", which was not published in English, and claims priority to German Patent Application Serial No. 102 17 853.4, which was filed on Apr. 22, 2002, which is hereby incorporated by reference in its entirety.

FIELD OF THE INVENTION

The invention relates to a device with the aid of which it is possible to calculate the FSM bits that determine the antenna weightings of a base station; particularly in the UMTS standard.

BACKGROUND OF THE INVENTION

In the case of a mobile radio system that comprises a base station with two antennas and a mobile radio subscriber, a fixed phase relationship is set up between the two transmission channels, which are to be assigned in each case to one of the antennas of the base station. In the UMTS (Universal Mobile Telecommunications System) standard, a so-called CLTD (Closed Loop Mode Transmit Diversity) function can be used to influence the relationship of the signals emitted by two antennas in order thereby to achieve constructive interference of the two transmission channels. The CLTD function can be operated in a mode 1 and a mode 2. The phase of one of the two antennas can be varied in mode 1. The phase of the other antenna remains fixed. The overall result is to vary the phase relationship between the two antennas. In addition to the variation, known from mode 1, in the phase relationship, mode 2 provides a variation in the amplitudes of the signals emitted from the antennas. The amplitudes of both antennas can be varied in mode 2.

The CLTD function is described in the 3GPP TS 25.214 UMTS specification. This specification is referenced repeatedly below. All data refer in this case to the V4.2.0 (2001-09) version.

FSM (Feedback Signalling Message) data words that are transmitted to the base station are formed in the mobile radio terminal from estimated channel impulse responses by means of the CLTD function. The channel impulse responses of both channels are always used in this case for an FSM data word. The FSM data words include information specific to the base station and relating to the optimum phase relationship and, if appropriate, relating to the optimum amplitudes of the signals to be emitted from the two antennas.

Two antenna weightings $w_1$ and $w_2$ that are applied to the signals which are to be emitted from the two antennas are formed in the base station from an FSM data word. The antenna weightings $w_1$ and $w_2$ are complex and have the following form:

$$w_1 = \alpha_1 + j\beta_1 \quad (1)$$

$$w_2 = \alpha_2 + j\beta_2 \quad (2)$$

Two diversity components are evaluated by multiplying the signals to be emitted by the antenna weightings $w_1$ and $w_2$. In this case, the antenna weightings $w_1$ and $w_2$ are selected with the aim of maximizing per slot the energy received by the mobile radio terminal while taking account of the weight quantization prescribed in the UMTS standard. This is equivalent to maximizing a proportionality factor P that is given by the following equation:

$$P = \vec{w}^H \begin{bmatrix} H_{11} & H_{12} \\ H_{21} & H_{22} \end{bmatrix} \vec{w} = \vec{w}^H \left( \sum_{m=1}^{M} H_m^H H_m \right) \vec{w} \quad (3)$$

Here, the index m denotes the respective base station m (m=1, ..., M). Furthermore, it holds for the matrix $H_m$ and the vector w that:

$$H_m = [\vec{h}_{m,1}, \vec{h}_{m,2}] \quad (4)$$

$$\vec{w} = [w_1, w_2]^T \quad (5)$$

The indices 1 and 2 relate to two antennas i of a base station m. $\vec{h}_{m,i}$ are complex ($N_m \times 1$) vectors that stand for the channel impulse responses estimated by the channel estimator with a channel depth $N_m$. Each vector $\vec{h}_{m,i}$ is to be associated with one of the antennas i of the base station m. It is to be assumed without loss of generality for the following considerations that only one base station m is sending (M=1). The index m is therefore omitted below, thus simplifying equation (4):

$$H = [\vec{h}_1, \vec{h}_2] \quad (6)$$

With i, j=1, 2, it holds for the elements $H_{ij}$ of the matrix from equation (3) that:

$$H_{ij} = \vec{h}_i^H \vec{h}_j = |H_{ij}| e^{j\varphi_{H_{ij}}}, \quad (7)$$

$|H_{ij}|$ specifying a modulus and $\phi_{H_{ij}}$ phase angle.

Consequently, the technical problem to be solved includes a determination of the antenna weightings $w_1$ and $w_2$ per slot in such a way that the proportionality factor P is maximized for given estimated channel impulse responses $\vec{h}_i = [h_{i,1}, \ldots, h_{i,n}, \ldots, h_{i,N}]^T$. The boundary conditions for the value ranges of the antenna weightings $w_1$ and $w_2$ are to be observed in this process.

The following boundary conditions hold for the antenna weightings $w_1$ and $w_2$ in mode 1 of the CLTD function:

$$w_1 = \frac{1}{\sqrt{2}} \quad (8)$$

$$w_2 = \frac{1}{\sqrt{2}} e^{j\varphi_2} \quad (9)$$

$$\varphi_2 \in \{0, \frac{\pi}{2}, \pi, -\frac{\pi}{2}\} \quad (10)$$

In this case, the phase angle $\phi_2(s)$ is a function of the slot index s (s=1, 2, ..., S). More detailed explanations of this are to be found in section 7.2 of the 3GPP TS 25.214 V4.2.0 UMTS specification.

The following boundary conditions hold for the antenna weightings $w_1$ and $w_2$ in mode 2 of the CLTD function:

$$w_1 = \sqrt{E_1} \tag{11}$$

$$w_2 = \sqrt{E_2}\, e^{j\varphi_2} \tag{12}$$

$$E_1, E_2 \in \{0.2, 0.8\} \tag{13}$$

$$E_1 + E_2 = 1 \tag{14}$$

$$\varphi_2 \in \left\{0, \frac{\pi}{4}, \frac{\pi}{2}, \frac{3\pi}{4}, \pi, -\frac{\pi}{4}, -\frac{\pi}{2}, -\frac{3\pi}{4}\right\} \tag{15}$$

Here, the amplitudes $E_1(s)$ and $E_2(s)$ as well as the phase angle $\varphi_2(s)$ are functions of the slot index s (s=1, 2, ..., S). Mode 2 is described in more detail in section 7.3 of the 3GPP TS 25.214 V4.2.0 UMTS specification.

To date, the optimum values for the phase angle $\varphi_2(s)$ and, if appropriate, for the amplitudes $E_1(s)$ and $E_2(s)$ have been determined as a function of the mode and slot index s by parameterizing equation (3) or by substituting the values in question. In this process, it is necessary in mode 1 to make a selection from only two phase angle values per slot. By contrast, it is necessary in mode 2 to evaluate 16 combinations of amplitude and phase angle. This problem has been solved to date by means of a digital signal processor because of the structure of the calculating algorithm. In this process, the digital signal processor generates on the output side an FSM data word which consists of FSM bits and includes information relating to the optimum values for the phase angle $\varphi_2(s)$ and, if appropriate, for the amplitudes $E_1(s)$ and $E_2(s)$.

SUMMARY OF THE INVENTION

It is an object of the invention to create a device with the aid of which FSM bits can be determined as a function of the mode and slot index in a particularly efficient fashion. A corresponding method for calculating the FSM bits is also to be specified.

The device according to the invention serves for calculating FSM bits by means of which the signals sent from two antennas of a base station are influenced with reference to their phase difference and/or their amplitudes. The FSM bits are calculated with the aid of two estimated channel impulse responses. In this process, a channel impulse response is related in each case to the channel belonging to one of the antennas. An essential idea of the invention resides in the fact that the device is hard-wired. It is therefore present as a hardware circuit.

Owing to the hardware design of the device according to the invention, the latter can carry out the required calculations substantially more efficiently than a digital signal processor. Furthermore, the device according to the invention is more favorable in terms of outlay than a digital signal processor.

The device forms a complex phasor from components of the two channel impulse responses and then generates an FSM bit by means of rotation and projection of the phasor and, in particular, of a threshold value decision. In particular, the channel coefficients, which are combined in a channel impulse response for each channel, can be complex. It is then also possible for the real or imaginary part of a channel coefficient to form a component of a channel impulse response.

The device advantageously has inputs, control inputs and an output. Components of the two channel impulse responses are applied to the inputs, and control signals are applied to the control inputs. This permits the device to calculate the FSM bit as a function of the components of the two channel impulse responses and the control signals. The FSM bit can be tapped at the output of the device.

A preferred refinement of the invention provides that the device includes a logic unit and a processing unit that is connected downstream of the logic unit.

The logic unit preferably has an equal number of inputs and outputs. The components of the two channel impulse responses are present at the inputs of the logic unit. The inputs of the logic unit are connected to the outputs of the logic unit as a function of at least one control signal.

In accordance with a further preferred refinement of the invention, a multiplier stage, an adder, a weighting stage, an accumulator and a threshold value decision unit are arranged in series in the processing unit.

It can preferably be provided in this case that the multiplier stage includes two multipliers that in each case multiply by one another two values supplied by the logic unit. For this purpose, the inputs of the multipliers are connected in each case to two outputs of the logic unit. The multiplication results for the two multipliers are added by the adder.

The sum formed by the adder is advantageously multiplied by a weighting factor in the weighting stage. The weighting factor results from a control signal that is present at the weighting stage.

A particularly preferred refinement of the invention is characterized in that the control signals are stored in the form of control bits in a read-only memory. This measure permits a calculating speed of the FSM bits that is higher by comparison with a digital signal processor.

The device according to the invention is, furthermore, designed with particular preference for the UMTS standard.

In the case of a device operating according to the UMTS standard, the control signals are preferably a function both of the slot number of the FSM bit whose calculation is pending at this instant, and of the CLTD mode. Owing to this refinement, the device is designed with sufficient flexibility to be able to carry out different types of calculations for all combinations of slot number and CLTD mode.

In accordance with a preferred refinement of the invention, the values of the control signals are a function of whether the slot number is an even or odd number.

The device according to the invention can be implemented with particular advantage in the associated mobile radio terminal.

FSM bits are calculated by means of the method according to the invention using two estimated channel impulse responses. In a first method step, a complex phasor is produced from components of the two channel impulse responses. In a second method step, this phasor is used to calculate an FSM bit by means of rotation, projection and, in particular, a threshold value decision. The method according to the invention is distinguished by a particularly efficient and quick calculation of the FSM bit.

BRIEF DESCRIPTIONS OF THE DRAWINGS

The invention is explained below in more detail by way of example with reference to the drawings, in which.

DETAILED DESCRIPTION OF THE INVENTION

Figure 1:
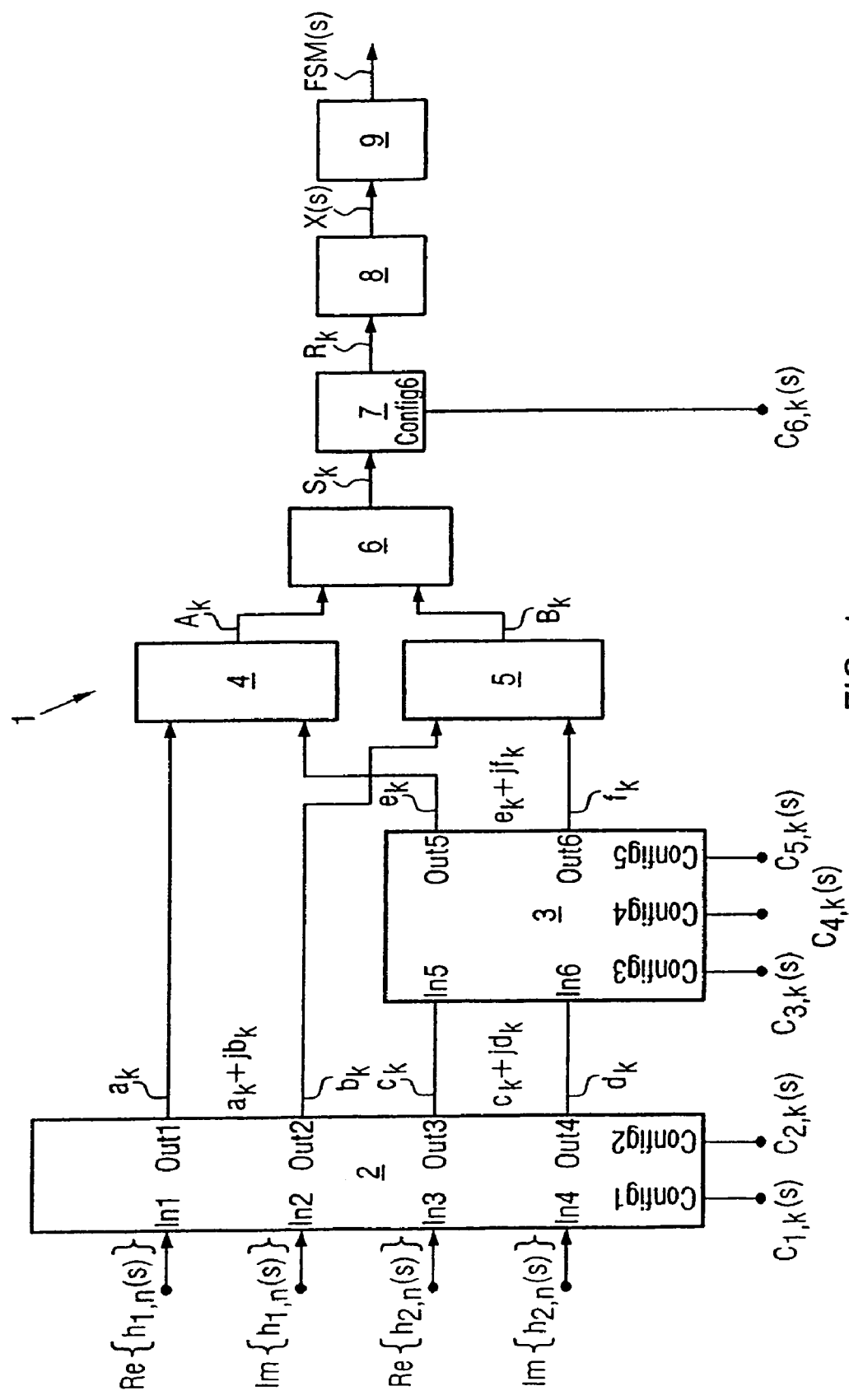
FIG. 1 shows a schematic block diagram of an exemplary embodiment of the device according to the invention.

A circuit 1 is illustrated in FIG. 1 as an exemplary embodiment for the device according to the invention. The circuit 1 comprises logic units 2 and 3, multipliers 4 and 5, an adder 6, a weighting unit 7, an accumulator 8 and a threshold value decision unit 9.

The logic unit 2 has inputs In1, In2, In3 and In4, configuration inputs Config1 and Config2 and outputs Out1, Out2, Out3 and Out4. The inputs In1, In2, In3 and In4 of the logic unit 2 are simultaneously inputs of the circuit 1. The logic unit 3 has inputs In5 and In6, configuration inputs Config3, Config4 and Config5 and outputs Out5 and Out6. The multipliers 4 and 5 and the adder 6 each have two inputs and one output. The weighting unit 7, the accumulator 8 and the threshold value decision unit 9 respectively comprise an input and an output. Furthermore, the weighting unit 7 includes a configuration input Config6. The output of the threshold value decision unit 9 constitutes the output of the circuit 1.

The output Out3 of the logic unit 2 is connected to the input In5 of the logic unit 3. The output Out4 of the logic unit 2 is connected to the input In6 of the logic unit 3.

One input of the multiplier 4 is coupled to the output Out1 of the logic unit 2. The second input of the multiplier 4 is coupled to the output Out5 of the logic unit 3.

One input of the multiplier 5 is coupled to the output Out2 of the logic unit 2. The second input of the multiplier 5 is coupled to the output Out6 of the logic unit 3.

The outputs of the multipliers 4 and 5 feed the inputs of the adder 6. Connected downstream of the adder 6 are the weighting unit 7, the accumulator 8 and the threshold value decision unit 9 in the prescribed sequence.

The circuit 1 is integrated in this case in a mobile radio terminal operating in accordance with the UMTS standard, and serves for generating FSM bits. The FSM bits are subsequently transmitted to the associated base station in which antenna weightings are produced from the FSM bits.

The base station has two antennas. Consequently, complex channel coefficients $h_{i,n}$ with a channel depth N are calculated by a channel estimator for two channels i (i=1, 2; n=1, 2, ..., N). The channel coefficients $h_{i,n}$ are combined for each channel i to form an N-component vector as channel impulse response $\vec{h}_i = [h_{i,1}, \ldots, h_{i,n}, \ldots, h_{i,N}]^T$. During the duration of a slot s, the real and imaginary parts of the channel coefficients $h_{1,n}$ and $h_{2,n}$ are present at the inputs In1, In2, In3 and In4 of the circuit 1. The configuration bits $C_{1,k}(s)$, $C_{2,k}(s)$, ..., $C_{6,k}(s)$ are present at the configuration inputs Config 1, Config 2, ..., Config 6. In accordance with the 3GPP TS 25.214 V4.2.0 UMTS specification, the slot index s runs from 1 to 15. The clock index k runs through the integral values from 1 to 2N. The path index n and the clock index k are in the ratio 1:2. This means that a channel coefficient $h_{i,n}$ is present two system clocks for processing on the circuit 1.

The mode of operation of the circuit 1 is as follows. The logic units 2 and 3 connect their inputs In1, ..., In6 to their outputs Out1, ..., Out6 as a function of the configuration bits $C_{1,k}(s)$, ..., $C_{5,k}(s)$. This produces a complex number $a_k + jb_k$ at the outputs Out1 and Out2, a complex number $c_k + jd_k$ at the outputs Out3 and Out4, and a complex number $e_k + jf_k$ at the outputs Out5 and Out6. On the output side, the multipliers 4 and 5 produce real numbers $A_k$ and $B_k$, respectively, the adder 6 produces a real number $S_k$, and the weighting unit 7 produces a real number $R_k$ as a function of the configuration bit $C_{6,k}(s)$. The accumulator 8 accumulates over twice the channel depth 2N, and produces a variable X(s) on the output side.

The threshold value decision unit 9 uses the variable X(s) to generate an FSM bit FSM(s) with the aid of the following distinction between cases:

$$X(s) < 0 \Rightarrow FSM(s) = 0 \quad (16)$$

$$X(s) \geq 0 \Rightarrow FSM(s) = 1 \quad (16)$$

The following Table 1 gives the precise mode of operation of the circuit 1:

| No. | $a_k + jb_k$ | $c_k + jd_k$ | $C_{1,k}(s), C_{2,k}(s)$ |
|---|---|---|---|
| 1. | k even: $Re\{h_{1,n}(s)\} + jIm\{h_{1,n}(s)\}$<br>k odd: 0 | k even: $Re\{h_{2,n}(s)\} + jIm\{h_{2,n}(s)\}$<br>k odd: 0 | 1, 1<br><br>X |
| 2. | k even: $Re\{h_{1,n}(s)\} + jIm\{h_{1,n}(s)\}$<br>k odd: 0 | k even: $Re\{h_{2,n}(s)\} + jIm\{h_{2,n}(s)\}$<br>k odd: 0 | 1, 1<br><br>X |
| 3. | $Re\{h_{1,n}(s)\} + jIm\{h_{1,n}(s)\}$ | $Re\{h_{2,n}(s)\} + jIm\{h_{2,n}(s)\}$ | 1, 1 |
| 4. | $Re\{h_{1,n}(s)\} + jIm\{h_{1,n}(s)\}$ | $Re\{h_{2,n}(s)\} + jIm\{h_{2,n}(s)\}$ | 1, 1 |
| 5. | $Re\{h_{1,n}(s)\} + jIm\{h_{1,n}(s)\}$ | $Re\{h_{2,n}(s)\} + jIm\{h_{2,n}(s)\}$ | 1, 1 |
| 6. | $Re\{h_{1,n}(s)\} + jIm\{h_{1,n}(s)\}$ | $Re\{h_{2,n}(s)\} + jIm\{h_{2,n}(s)\}$ | 1, 1 |
| 7. | $Re\{h_{1,n}(s)\} + jIm\{h_{1,n}(s)\}$ | $Re\{h_{2,n}(s)\} + jIm\{h_{2,n}(s)\}$ | 1, 1 |
| 8. | $Re\{h_{1,n}(s)\} + jIm\{h_{1,n}(s)\}$ | $Re\{h_{2,n}(s)\} + jIm\{h_{2,n}(s)\}$ | 1, 1 |
| 9. | k even: $Re\{h_{1,n}(s)\} + jIm\{h_{1,n}(s)\}$<br>k odd: $Re\{h_{2,n}(s)\} + jIm\{h_{2,n}(s)\}$ | k even: $Re\{h_{1,n}(s)\} + jIm\{h_{1,n}(s)\}$<br>k odd: $Re\{h_{2,n}(s)\} + jIm\{h_{2,n}(s)\}$ | 1, 0<br><br>0, 1 |

| No. | $e_k + jf_k$ | $C_{3,k}(s), C_{4,k}(s), C_{5,k}(s)$ | $A_k$ | $B_k$ | $S_k$ |
|---|---|---|---|---|---|
| 1. | k even: $c_k + jd_k$<br>k odd: 0 | 1, 1, 1<br>X | $a_k e_k$ | $b_k f_k$ | $A_k + B_k$ |
| 2. | k even: $-d_k + jc_k$<br>k odd: 0 | 0, 0, 1<br>X | $a_k e_k$ | $b_k f_k$ | $A_k + B_k$ |
| 3. | k even: $c_k + jd_k$<br>k odd: $-d_k + jc_k$ | 1, 1, 1<br>0, 0, 1 | $a_k e_k$ | $b_k f_k$ | $A_k + B_k$ |
| 4. | k even: $c_k + jd_k$<br>k odd: $d_k - jc_k$ | 1, 1, 1<br>1, 1, 0 | $a_k e_k$ | $b_k f_k$ | $A_k + B_k$ |
| 5. | k even: $-c_k - jd_k$<br>k odd: $-d_k + jc_k$ | 1, 0, 0<br>0, 0, 1 | $a_k e_k$ | $b_k f_k$ | $A_k + B_k$ |
| 6. | k even: $c_k + jd_k$<br>k odd: $-d_k + jc_k$ | 1, 1, 1<br>0, 0, 1 | $a_k e_k$ | $b_k f_k$ | $A_k + B_k$ |
| 7. | k even: $c_k + jd_k$<br>k odd: $d_k - jc_k$ | 1, 1, 1<br>0, 1, 0 | $a_k e_k$ | $b_k f_k$ | $A_k + B_k$ |
| 8. | k even: $-c_k - jd_k$<br>k odd: $d_k - jc_k$ | 1, 0, 0<br>0, 1, 0 | $a_k e_k$ | $b_k f_k$ | $A_k + B_k$ |
| 9. | k even: $c_k + jd_k$<br>k odd: $-c_k - jd_k$ | 1, 1, 1<br>1, 0, 0 | $a_k e_k$ | $b_k f_k$ | $A_k + B_k$ |

| No. | $R_k$ | $C_{6,k}(s)$ | X(s) |
|---|---|---|---|
| 1. | k even: $1 \cdot S_k$<br>k odd: 0 | 1<br>X | $Re\{H_{21}(s)\}$ |
| 2. | k even: $1 \cdot S_k$<br>k odd: 0 | 1<br>X | $Im\{H_{21}(s)\}$ |
| 3. | k even: $\tan(\pi/8) \cdot S_k$<br>k odd: $1 \cdot S_k$ | 0<br>1 | $Im\{H_{21}(s) \cdot \exp(j\pi/8)/\cos(\pi/8)\}$ |
| 4. | k even: $1 \cdot S_k$<br>k odd: $\tan(\pi/8) \cdot S_k$ | 1<br>0 | $Re\{H_{21}(s) \cdot \exp(j\pi/8)/\cos(\pi/8)\}$ |
| 5. | k even: $\tan(\pi/8) \cdot S_k$<br>k odd:: $1 \cdot S_k$ | 0<br>1 | $Im\{H_{21}(s) \cdot \exp(-j\pi/8)/\cos(\pi/8)\}$ |
| 6. | k even: $1 \cdot S_k$<br>k odd: $\tan(\pi/8) \cdot S_k$ | 1<br>0 | $Re\{H_{21}(s) \cdot \exp(-j\pi/8)/\cos(\pi/8)\}$ |
| 7. | k even: $\tan(\pi/8) \cdot S_k$<br>k odd:: $1 \cdot S_k$ | 0<br>1 | $-Im\{H_{21}(s) \cdot \exp(-j\pi/8)/\cos(\pi/8)\}$ |
| 8. | k even: $1 \cdot S_k$<br>k odd: $\tan(\pi/8) \cdot S_k$ | 1<br>0 | $-Re\{H_{21}(s) \cdot \exp(-j\pi/8)/\cos(\pi/8)\}$ |
| 9. | k even: $1 \cdot S_k$<br>k odd: $1 \cdot S_k$ | 1<br>1 | $|H_{11}(s)|^2 - |H_{22}(s)|^2$ |

The three blocks of Table 1 set forth one below the other are to be understood such that each row of a block is continued in the corresponding row of the subsequent block.

The stipulations which produce the configuration bits $C_{1,k}(s), C_{2,k}(s), \ldots, C_{6,k}(s)$ can be read off from Table 1.

For $C_{1,k}(s)=1$ and $C_{2,k}(s)=1$, the inputs In1, ..., In4 of the logic unit 2 are connected to the outputs Out1, ..., Out4 respectively situated opposite them in FIG. 1. For $C_{1,k}(s)=0$, the inputs In1 and In2 are applied to the outputs Out3 and Out4, respectively. For $C_{2,k}(s)=0$, the inputs In3 and In4 are applied to the outputs Out1 and Out2, respectively.

The configuration bit $C_{3,k}(s)$ decides on the assignment of the outputs Out5 and Out6 of the logic unit 3 to the inputs In5 and In6. For $C_{3,k}(s)=1$, the input In5 is applied to the output Out5, and the input In6 is applied to the output Out6. For $C_{3,k}(s)=0$, the input In5 is applied to the output Out6, and the input In6 is applied to the output Out5.

The configuration bits $C_{4,k}(s)$ and $C_{5,k}(s)$ determine the signs of the outputs Out5 and Out6, respectively. For $C_{4,k}(s)=1$ and $C_{5,k}(s)=1$, the outputs Out5 and Out6 have a positive sign, while for $C_{4,k}(s)=0$ and $C_{5,k}(s)=0$ the signs of the outputs Out5 and Out6 are negative.

The configuration bit $C_{6,k}(s)$ decides on the weighting that is applied to the number $S_k$ in the weighting unit 7. For $C_{6,k}(s)=1$, the number $S_k$ remains unchanged, while for $C_{6,k}(s)=0$ the number $S_k$ is multiplied by the factor $\tan(\pi/8)$.

A value "X" in Table 1 for one of the conguration bits $C_{1,k}(s), \ldots, C_{6,k}(s)$ means that the block is not clocked and therefore does not produce a new output.

In order to be able to apply Table 1, a need further exists to stipulate the row of Table 1 that is to be considered. Such a row specification is provided by Table 2, which is set forth below and forms a relationship between the combination of CLTD mode and slot index s with the row numbers of Table 1.

| CLTD mode/slot combination | No. from Table 1 |
|---|---|
| Mode 1 s even | 1 |
| Mode 2 s odd | 2 |
| Mode 2 s modulo 4 = 0 | 3 |
| Mode 2 s modulo 4 = 1 | 4 |
| Mode 2 s modulo 4 = 2 | 5 or 6 or 7 or 8 |
| Mode 2 s modulo 4 = 3 | 9 |

Given s modulo 4=2, in mode 2 a selection is made between the row numbers 5, 6, 7 or 8 of Table 1 as a function of the results of FSM(s−1) and FSM(s−2). The corresponding assignments can be read off at the entries of Table 3, which is set forth below.

| FSM (s − 2) | FSM (s − 1) | No. from Table 1 |
|---|---|---|
| 0 | 0 | 7 |
| 0 | 1 | 8 |
| 1 | 0 | 6 |
| 1 | 1 | 5 |

Note that in accordance with 3GPP TS 25.214 V4.2.0 UMTS specification, in mode 1 one FSM data word consists of an FSM bit FSM(s), and in mode 2 it consists of four FSM bits FSM(s). Consequently, in mode 1 with progressive slot index s Nos. 1 and 2 from Table 1 are used alternately for configuring circuit 1. In mode 2, rows Nos. 3, 4, 5 to 8 and 9 are selected on the basis of the four FSM bits FSM(s) of the FSM data word with a periodicity of 4 with reference to the slot index s.

The entries in Tables 1 and 2 are preferably stored in a read-only memory and therefore need not be calculated during processing.

The relationships on which the entries in Tables 1 and 2 are based are explained below.

For all CLTD mode/slot combinations, the calculation of an FSM bit FSM(s) can be reduced to merely considering one or two elements Hij of the matrix from equation (3). The elements Hij are subjected to the same processing in order to calculate an FSM bit FSM(s). This processing consists essentially of rotations and projections.

The matrix element $H_{21}=|H_{21}|e^{j\Phi_{H_{21}}}$ is considered for CLTD mode/slot combinations in which the FSM bit FSM(s) pronounces on the phase angle $\phi_2$. The derivation of equation (3) in terms of the phase angle $\phi_2$ leads to the maximum value of the proportionality factor P for both CLTD modes and for $\phi_2=\phi_{H_{21}}$.

The matrix elements $H_{11}$ and $H_{22}$ are considered for CLTD mode/slot combinations in which the FSM bit FSM(s) pronounces on the moduli of the antenna weightings $w_1$ and $w_2$. Taking account of the stipulations of the 3GPP TS 25.214 V4.2.0 UMTS specification, in accordance with which the amplitudes $E_1(s)$ and $E_2(s)$ can assume only two values, this requires only that the difference $|H_{11}|^2-|H_{22}|^2$ be evaluated.

The specific processing operations for different CLTD mode/slot combinations differ from one another, in particular, in the rotation of the complex phasor, given by the matrix element $H_{21}$, in the plane of complex numbers, and in its projection onto the real or imaginary axis. The respective processing operation is controlled by means of the configuration bits $C_{1,k}(s), \ldots, C_{6,k}(s)$. The 9 possible processing cases of circuit 1 are listed in Table 1.

Figure 2:
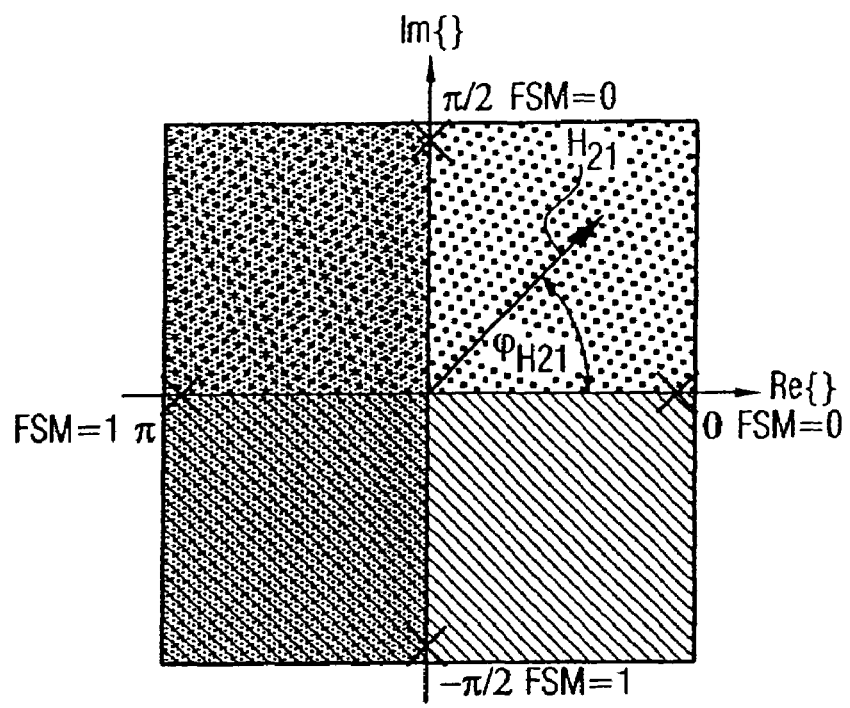
FIG. 2 shows a diagram of the mode of operation of the device according to the invention in the plane of complex numbers for mode 1.

The constellations in the plane of complex numbers that have to be evaluated in mode 1 are illustrated in FIG. 2.

Section 7.2 of the 3GPP TS 25.214 V4.2.0 UMTS specification stipulates that during normal operation of the CLTD function in mode 1, that is to say without an initialization or a so-called compressed mode, it is necessary to evaluate for an even slot index s whether the complex phasor $H_{21}$ in FIG. 2 lies in the bright complex half plane, that is to say in the $1^{st}$ or $4^{th}$ quadrant, or in the dark complex half plane, that is to say in the $2^{nd}$ or $3^{rd}$ quadrant. It is necessary to evaluate for an odd slot index s whether the complex phasor $H_{21}$ lies in the stippled complex half plane, that is to say in the $1^{st}$ or $2^{nd}$ quadrant, or in the dashed complex half plane, that is to say in the $3^{rd}$ or $4^{th}$ quadrant. Given the progressive slot index s, both tasks are accomplished by the alternate use of rows Nos. 1 and 2 from Table 1.

Figure 3:
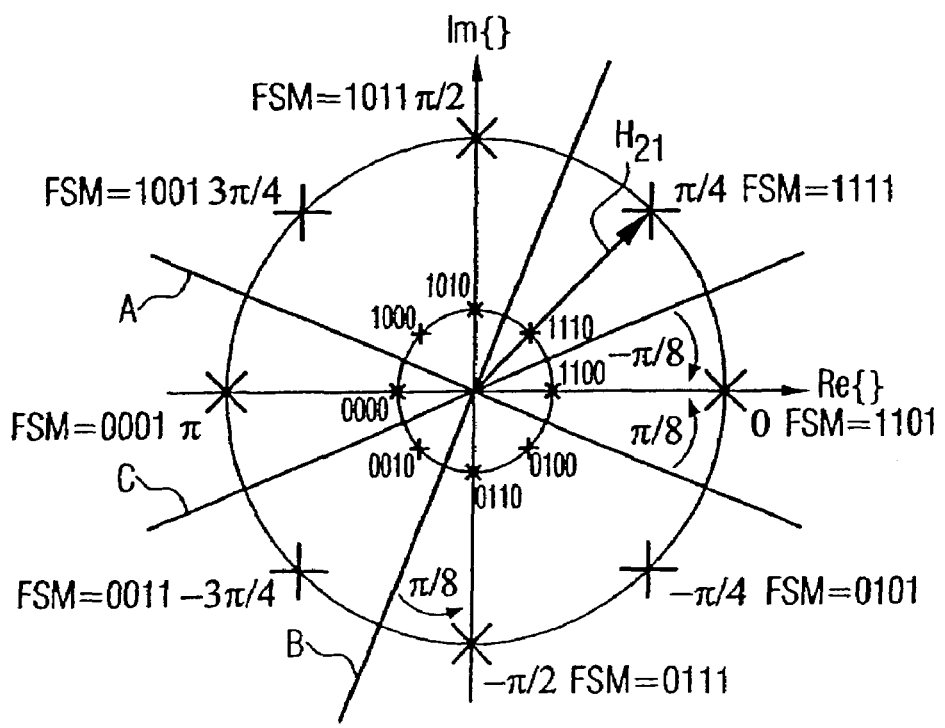
FIG. 3 shows a diagram of the mode of operation of the device according to the invention in the plane of complex numbers for mode 2.

The constellations in the plane of complex numbers that have to be evaluated in mode 2 are illustrated in FIG. 3.

Here, as well, the circuit 1 is to be described in the normal operating mode of the CLTD function in mode 2, that is to say outwith a so-called end of frame adjustment, an initialization or a compressed mode. It is described below how the four FSM bits FSM(s) of the FSM data word are obtained for a phasor $H_{21}$ with $|H_{11}|>|H_{22}|$ in the plane of complex numbers in the angular segment between $\pi/8$ and $3\pi/8$. This phasor $H_{21}$ is depicted in FIG. 3.

Row No. 3 from Table 1 is to be applied for s=0 in mode 2 according to Table 2. In accordance with row No. 3 from Table 1, it is necessary to investigate whether the term Im{$H_{21}(s) \cdot e^{j\pi/8}/\cos(\pi/8)$} specifying the variable X(s) is positive or negative. This term clearly specifies that the phasor $H_{21}$ is rotated counterclockwise by the angle $\pi/8$ in the plane of complex numbers because of the multiplication by the factor $e^{j\pi/8}$, is stretched by the factor $1/\cos(\pi/8)$, and is subsequently projected onto the imaginary axis. An investigation is thereupon conducted as to whether this projection lies on the positive or the negative half straight line of the imaginary axis. In the plane of complex numbers, the operations described can be replaced by a threshold value decision. It is necessary for this purpose to investigate whether the phasor $H_{21}$ lies above or below the straight line A depicted in FIG. 3. The straight line A is rotated clockwise by the angle $\pi/8$ in relation to the real axis, and thereby compensates the counterclockwise rotation of the phasor $H_{21}$ by the angle $\pi/8$. In the present case, the phasor $H_{21}$ lies above the straight line A, and so the FSM bit FSM(0) assumes the value 1.

The rotation by the angle $\pi/8$ or $-\pi/8$ is taken into account in the circuit 1 by using the weightings 1 and $\tan(\pi/8)$ in the weighting unit 7. In this case, the phasor $H_{21}$ is stretched by the factor $1/\cos(\pi/8)$, but this is not significant for the statement relating to the angle.

For s=1, row No. 4 from Table 1 is used in mode 2 according to Table 2 for the purpose of calculating the FSM bit FSM(1). It is therefore necessary here to consider the term Re{$H_{21}(s) \cdot e^{j\pi/8}/\cos(\pi/8)$}. In a corresponding way to the procedure in the case of s=0, it is necessary in this case to investigate on which side of the straight line B depicted in FIG. 3 the phasor $H_{21}$ lies. The straight line B results from a clockwise rotation of the real axis by an angle of $\pi/8$. A value of 1 results in this case for the FSM bit FSM(1).

According to row No. 5 from Table 1, for s=2 an evaluation must take place with reference to the straight line C depicted in FIG. 3. The straight line C is rotated clockwise by the angle $\pi/8$ with reference to the imaginary axis. A value of 1 results for the FSM bit FSM(2).

Row No. 9 from Table 1 is used for s=3. This leads to a value of 1 for the FSM bit FSM(3). In total, the FSM data word resulting from the phasor $H_{21}$ is 1111.

Various possible positions of the phasor $H_{21}$ are marked by crosses by way of example in FIG. 3. The FSM data words associated with these positions are noted next to them.

| List of reference symbols | |
|---|---|
| 1 | Circuit |
| 2 | Logic unit |
| 3 | Logic unit |
| 4 | Multiplier |
| 5 | Multiplier |
| 6 | Adder |
| 7 | Weighting unit |
| 8 | Accumulator |
| 9 | Threshold value decision unit |
| In1, ..., In6 | Inputs |
| Config1, ..., Config6 | Configuration inputs |
| Out1, ..., Out6 | Outputs |
| $h_{i,n}(s)$ | Channel coefficients |
| Re{$h_{1,n}(s)$}, Re{$h_{2,n}(s)$} | Real parts of channel coefficients |
| Im{$h_{1,n}(s)$}, Im{$h_{2,n}(s)$} | Imaginary parts of channel coefficients |
| FSM (s) | FSM bit |
| $C_{1,k}(s), C_{2,k}(s), \ldots, C_{6,k}(s)$ | Configuration bits |
| i | Channel (i = 1, 2) |
| s | Slot index (s = 1, ..., 15) |
| n | Path index (n = 1, ..., N) |
| k | Clock index (k = 1, ..., 2N) |
| $a_k, c_k, e_k$ | Real parts |
| $b_k, d_k, f_k$ | Imaginary parts |
| $a_k + jb_k, c_k + jd_k, e_k + jf_k$ | Complex numbers |
| $A_k, B_k, S_k, R_k$ | Numbers |
| X (s) | Variable |
| $H_{21}$ | Complex phasor |
| A, B, C | Straight lines |

The invention claimed is:

1. A device for calculating feedback signaling message (FSM) bits, comprising:
a circuit configured to calculate feedback signaling message (FSM) bits by means of which the signals sent from two antennas of a base station are influenced with reference to their phase difference and/or their amplitudes with the aid of the two estimated channel impulse responses, wherein the circuit is in hard-wired form,
wherein the circuit is configured to generate a first complex phasor from first components of the two channel impulse responses and a second complex phasor from second components of the two channel impulse responses, and further configured to produce a first FSM bit by a rotation and projection of the first phasor and a comparison of the rotated and projected first phasor with a constant threshold value and configured to produce a second FSM bit by a rotation and projection of the second phasor and a comparison of the rotated and projected second phasor with the constant threshold value,
and wherein the first and the second components of the two channel impulse responses comprise different components.

2. The device as claimed in claim 1,
wherein the components of the two channel impulse responses are applied at inputs of the circuit, and wherein
control signals are applied at control inputs of the circuit, and wherein
the FSM bit is provided at an output of the circuit, the FSM bit being calculated as a function of the components of the two channel impulse responses and the control signals.

3. The device as claimed in claim 2,
wherein the circuit comprises a logic unit configure to receive and selectively arrange the two channel impulse responses, and a processing unit connected downstream of the logic unit configured to process the two channel impulse responses based on the selective arrangement thereof.

4. The device as claimed in claim 3,
wherein the components of the two channel impulse responses are present at inputs of the logic unit, wherein
the logic unit has outputs whose number is equal to the number of its inputs, and wherein
the inputs of the logic unit are connected to the outputs of the logic unit as a function of at least one of the control signals.

5. The device as claimed in claim 3,
wherein the processing unit comprises a multiplier stage, an adder, a weighting stage, an accumulator and a threshold value decision unit connected in series in the prescribed sequence.

6. The device as claimed in claim 5,
wherein the multiplier stage has two multipliers, whose inputs are connected in each case to two outputs of the logic unit, and wherein
the inputs of the adder are connected to the outputs of the multipliers.

7. The device as claimed in claim 6,
further comprising a control signal coupled as an input to the weighting stage, and
wherein the weighting stage applies is configured to apply a weighting factor to a sum formed by the adder as a function of the control signal coupled thereto.

8. The device as claimed in claim 2,
wherein the control signals are stored in the form of control bits in a read-only memory.

9. The device as claimed in claim 1, wherein the circuit is designed for the UMTS standard.

10. The device as claimed in claim 9,
wherein the control signals are a function of the slot number of the FSM bit to be calculated, and of a CLTD mode.

11. The device as claimed in claim 10,
wherein the control signals are a function of whether the slot number of the FSM bit to be calculated is an even or odd number.

12. A mobile radio terminal having a device as claimed in claim 1.

13. A method for calculating FSM bits utilizing a device which determines antenna weightings of a base station, comprising:
producing a first complex phasor from first components of two estimated channel impulse responses and a second complex phasor from second components of the two estimated channel impulse responses; and
calculating a first FSM bit by rotation and projection of the first phasor and a second FSM bit by rotation and projection of the second phasor,
wherein the first and second FSM bits influence signals sent from two antennas of a base station with reference to their phase difference and/or their amplitudes with the aid of the two estimated channel impulse responses,
and wherein the first and the second components of the two channel impulse responses comprise different components.

14. The method as claimed in claim 13,
wherein the rotation and projection of the phasor is determined by control signals.

15. The method as claimed in claim 13,
wherein calculating the FSM bit comprises performing a threshold value comparison after the rotation and projection of the phasor.

16. The method as claimed in claim 14, wherein the method is designed for the UMTS standard.

17. The method as claimed in claim 16,
wherein the control signals are a function of the slot number of the FSM bit to be calculated, and of a CLTD mode.

18. The method as claimed in claim 17,
wherein the control signals are a function of whether the slot number of the FSM bit to be calculated is an even or odd number.

* * * * *